(12) United States Patent
Morishima et al.

(10) Patent No.: US 8,266,896 B2
(45) Date of Patent: Sep. 18, 2012

(54) EXHAUST PURIFICATION SYSTEM FOR INTERNAL COMBUSTION ENGINE

(75) Inventors: Akinori Morishima, Susono (JP); Taro Aoyama, Susono (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 434 days.

(21) Appl. No.: 12/450,723

(22) PCT Filed: Apr. 4, 2008

(86) PCT No.: PCT/JP2008/057124
§ 371 (c)(1),
(2), (4) Date: Oct. 9, 2009

(87) PCT Pub. No.: WO2008/126912
PCT Pub. Date: Oct. 23, 2008

(65) Prior Publication Data
US 2010/0126148 A1 May 27, 2010

(30) Foreign Application Priority Data
Apr. 10, 2007 (JP) ................................ 2007-103119

(51) Int. Cl.
*F01N 3/00* (2006.01)
*F01N 3/10* (2006.01)
(52) U.S. Cl. ............... 60/287; 60/286; 60/299; 60/303
(58) Field of Classification Search .................. 60/287
See application file for complete search history.

(56) References Cited

U.S. PATENT DOCUMENTS

| | | | |
|---|---|---|---|
| 5,085,050 A * | 2/1992 | Katoh | 60/288 |
| 5,406,790 A * | 4/1995 | Hirota et al. | 60/276 |
| 6,018,943 A | 2/2000 | Martin et al. | |
| 6,178,743 B1 * | 1/2001 | Hirota et al. | 60/277 |

(Continued)

FOREIGN PATENT DOCUMENTS

DE        43 42 062 A1     6/1994

(Continued)

OTHER PUBLICATIONS

English translation of JP2006-233894A.*

(Continued)

*Primary Examiner* — Thomas Denion
*Assistant Examiner* — Jason Shanske
(74) *Attorney, Agent, or Firm* — Oliff & Berridge, PLC

(57) ABSTRACT

A technique is provided that enables reducer concentrations in exhaust gas flowing into an exhaust purification device on the upstream side and an exhaust purification device on the downstream side provided to an exhaust pipe in series to be controlled separately with a simple configuration. Included are the two exhaust purification devices provided to an exhaust passage in series, a bypass passage that bypasses the exhaust purification device on the upstream side, an exhaust control valve provided to the bypass passage, and reducer supply means provided on the upstream side of a branch portion. A reducer is supplied intermittently from the reducer supply means to periodically change the reducer concentration in the exhaust gas, and the exhaust control valve is opened or closed periodically at a predetermined timing with respect to the change in the reducer concentration. Accordingly, the supplied reducer is distributed to be introduced to the exhaust purification device on the upstream side or to be introduced to the exhaust purification device on the downstream side via the bypass passage.

20 Claims, 5 Drawing Sheets

U.S. PATENT DOCUMENTS

| | | | |
|---|---|---|---|
| 6,192,675 B1 * | 2/2001 | Hirota et al. | 60/286 |
| 2002/0073694 A1 * | 6/2002 | Minami | 60/288 |
| 2003/0106306 A1 * | 6/2003 | Nakatani et al. | 60/288 |
| 2005/0217244 A1 * | 10/2005 | Kamoto et al. | 60/277 |
| 2005/0262828 A1 * | 12/2005 | Iihoshi et al. | 60/277 |
| 2006/0283178 A1 | 12/2006 | Akagawa | |
| 2007/0169468 A1 | 7/2007 | Yokoi et al. | |

FOREIGN PATENT DOCUMENTS

| | | |
|---|---|---|
| JP | A-05-231140 | 9/1993 |
| JP | A-08-014027 | 1/1996 |
| JP | A-11-062567 | 3/1999 |
| JP | A-2000-265827 | 9/2000 |
| JP | A-2001-140631 | 5/2001 |
| JP | A-2002-047954 | 2/2002 |
| JP | A-2002-349236 | 12/2002 |
| JP | A-2003-013730 | 1/2003 |
| JP | A-2005-248765 | 9/2005 |
| JP | A-2005-256714 | 9/2005 |
| JP | A-2006-226216 | 8/2006 |
| JP | 2006233894 A * | 9/2006 |
| JP | A-2006-233894 | 9/2006 |

OTHER PUBLICATIONS

Nov. 9, 2010 Supplementary European Search Report issued in European Application No. 08740222.8.

* cited by examiner

EXHAUST PURIFICATION SYSTEM FOR INTERNAL COMBUSTION ENGINE

This is a National Stage of International Application No. PCT/JP2008/057124 filed Apr. 4, 2008, which claims the benefit of Japanese Patent Application No. 2007-103119 filed Apr. 10, 2007. The disclosure of the prior applications is hereby incorporated by reference herein in its entirety.

TECHNICAL FIELD

The present invention relates to an exhaust purification system for an internal combustion engine.

BACKGROUND ART

NOx and other harmful substances are contained in the exhaust gas of an internal combustion engine. It is known that a NOx catalyst for purifying NOx in the exhaust gas may be provided in the exhaust system of the internal combustion engine to reduce discharge of these harmful substances. In this technique, when a storage-reduction type NOx catalyst is provided, the purification performance decreases as the amount of stored NOx increases, and therefore, a reducer is supplied to the storage-reduction type NOx catalyst by performing a rich spike control to reduce and release the NOx stored in the catalyst (hereinafter referred to as a "NOx reduction treatment").

Furthermore, a reducer is sometimes supplied to the NOx catalyst in addition to raising the bed temperature of the NOx catalyst in order to counteract SOx poisoning in which SOx in the exhaust gas stored in the NOx catalyst results in a decreased purification performance (hereinafter referred to as a "SOx regeneration treatment"). In the SOx regeneration treatment, the reducer is also used for raising the bed temperature of the NOx catalyst.

Meanwhile, particulate matter (PM) having carbon as a main component is also contained in the exhaust gas of an internal combustion engine. In a known technique for preventing emission of the particulate matter into the atmosphere, a particulate filter (hereafter referred to as a "filter") is provided in the exhaust system of the internal combustion engine to trap the particulate matter.

In this filter, as the accumulated amount of the trapped particulate matter increases, the filter becomes clogged, causing an increase in back pressure for the exhaust gas and a decrease in the engine performance. Thus, the temperature of the filter is raised to remove the trapped particulate matter through oxidation (hereinafter referred to as "PM regeneration treatment"). Fuel as the reducer is sometimes supplied to the filter to raise the temperature of the filter in this case as well.

In relation to such techniques for an exhaust purification system, a technique described in Japanese Patent Application Publication No. JP-A-2002-349236 is known. That is, a NOx storage reduction catalyst is provided to an exhaust pipe of an engine, and a liquid injection nozzle capable of injecting a reducer is provided to the exhaust pipe on an upstream side of the NOx storage reduction catalyst with respect to the exhaust gas. A particulate filter that functions as an oxidation catalyst is provided to the exhaust pipe on a downstream side of the NOx storage reduction catalyst with respect to the exhaust gas. Further, a bypass pipe is connected to the exhaust pipe to bypass the NOx storage reduction catalyst, and an exhaust gas regulating valve switches the flow of the exhaust gas to the NOx storage reduction catalyst or to the bypass pipe. The injection of the reducer and the opening degree of the exhaust gas regulating valve are each controlled based on a detection output of a temperature sensor that detects a temperature of the exhaust gas within the exhaust pipe on the upstream side of the NOx storage reduction catalyst with respect to the exhaust gas.

In this technique, in the case where the temperature of the exhaust gas is less than a predetermined value, the injection of the reducer is turned off, and the exhaust gas regulating valve is regulated such that the exhaust gas flows in the NOx storage reduction catalyst and does not flow in the bypass pipe. Accordingly, NOx in the exhaust gas is stored in the catalyst, and HC in the exhaust gas is oxidized by an oxidation effect of noble metal supported by the catalyst. In the case where the temperature of the exhaust gas is greater than or equal to the predetermined value, the exhaust gas regulating valve is regulated to cause a large part of the exhaust gas to flow in the bypass pipe and a part of the exhaust gas to flow in the catalyst, and simultaneously injecting the reducer from the liquid injection nozzle. Accordingly, the air excess ratio of the exhaust gas at the entrance of the catalyst decreases, and the NOx stored in the catalyst reacts with the HC or the like to become $N_2$, $CO_2$, and $H_2O$ and be released from the catalyst. A part of HC or the like created by the injection of the reducer passes through the catalyst and is trapped by the filter. The HC or the like trapped by the filter is oxidized and burned by the oxidation effect of an active metal supported by the filter, since a large part of the exhaust gas flows in the bypass pipe and the exhaust gas having a high air excess ratio flows into the filter when the reducer is being injected.

According to this technique, the NOx contained in the exhaust gas and the discharge amount of the particulate can be reduced with high efficiency, and a discharge of the reducer injected from the liquid injection nozzle to the exhaust pipe into an atmosphere in a gasified state can be prevented.

As described in Japanese Patent Application Publication No. JP-A-2005-248765, a technique is known in which a route for bypassing a NOx catalyst during PM regeneration treatment is provided to prevent thermal deterioration of the NOx catalyst, and thermal load on the NOx catalyst is reduced by causing a complete bypass of the exhaust gas.

However, in the first technique described above, it has always been necessary to cause the reducer to pass through the NOx catalyst in the case of attempting to supply the reducer to the filter, since the liquid injection nozzle is arranged on the downstream side of a branch portion of the exhaust pipe with the bypass pipe. In the second technique described above, it has been necessary to provide the exhaust gas regulating valve to both of the exhaust pipe and the bypass pipe or to provide a three-way valve in the branch portion in order to cause the exhaust gas to completely bypass the NOx catalyst. Accordingly, there has been a possibility of cost reduction being hindered by a complication in a system.

Also, it has been difficult to separately control reducer concentrations in the exhaust gas flowing into an exhaust purification device on the upstream side and into an exhaust purification device on the downstream side.

As another technique relating to the exhaust purification device, there is a technique described in Japanese Patent Application Publication No. JP-A-2000-265827. This technique includes an exhaust purification catalyst arranged in an exhaust passage immediately beneath an exhaust manifold, a bypass passage bypassing the exhaust purification catalyst, a sensor that detects the temperature of exhaust gas, and an exhaust control valve that restricts the flow of the exhaust gas into the exhaust purification catalyst. A controller loosens the restriction by the exhaust control valve to increase the exhaust gas amount flowing into the exhaust purification catalyst in the case where a condition for raising the temperature of the exhaust purification catalyst is satisfied. Accordingly, the catalyst temperature is raised without affecting the drivability or fuel consumption.

Also, there is a technique described in Japanese Patent Application Publication No. JP-A-2003-013730. In this technique, a NOx catalyst is supported by a particulate filter in a diesel engine, a portion of an exhaust passage on the upstream of an oxidation catalyst and a portion on the downstream of the oxidation catalyst and upstream of the particulate filter are connected by a bypass passage, reducer supply means that supplies a NOx reducer is provided in the bypass passage, and a switching valve that switches the flow of exhaust gas to the oxidation catalyst side or to the bypass passage according to the temperature of the oxidation catalyst is provided in a branch portion on the upstream of the oxidation catalyst in the bypass passage.

Also, there is a technique described in Japanese Patent Application Publication No. JP-A-11-062567. This technique includes: a NOx conversion catalyst that is arranged in a main discharge line of an engine, has a NOx conversion coefficient of less than or equal to a certain coefficient, and has a separate temperature range; a bypass line connected to a main discharge line in a bypassing manner and including NOx trapping means that is arranged upstream of the catalyst and that traps, converts, and then discharges the NOx; a valve that regulates a gas amount in the main discharge line and a bypass line, for enabling the trapping means to trap the NOx when the conversion catalyst has the conversion coefficient of less than or equal to a specific value and to release the NOx simultaneously with the conversion.

Also, there is a technique described in Japanese Patent Application Publication No. JP-A-05-231140. This technique provides an exhaust gas purification system in which a lean NOx catalyst that purifies NOx during a lean operation is arranged on the upstream side, with respect to an exhaust path, of a three-way catalyst operating during a stoichiometric operation. In the exhaust gas purification system, the exhaust path is formed thereon with a bypass path that enables a part of exhaust gas G discharged during each operation to bypass the lean NOx catalyst and directly flow into the three-way catalyst.

Also, there is a technique described in Japanese Patent Application Publication No. JP-A-2005-256714. In this technique, fuel addition is executed in the form of intermittent addition by a burn-up control when a PM accumulated amount PMsm in an exhaust purification member is less than or equal to a determination value A. On the other hand, the fuel addition is continued in the form of a continuous addition by a PM regeneration control when the PM accumulated amount PMsm in the exhaust purification member is greater than the determination value A.

An object of the present invention is to provide a technique that enables reducer concentrations in exhaust gas flowing into an exhaust purification device on the upstream side and an exhaust purification device on the downstream side that are provided in series in an exhaust passage to be separately controlled with a simple configuration.

DISCLOSURE OF THE INVENTION

The present invention for achieving the object mainly features the following points. That is, two exhaust purification devices provided to an exhaust passage in series, a bypass passage that bypasses the exhaust purification device on the upstream side, an exhaust control valve provided to the bypass passage or on the downstream side of a branch portion toward the bypass passage in the exhaust passage, and reducer supply device provided on the upstream side of the branch portion are provided. A reducer is supplied intermittently from the reducer supply device to periodically change the reducer concentration in the exhaust gas, and the exhaust control valve is opened or closed periodically at predetermined timings with respect to the change in the reducer concentration. Accordingly, the supplied reducer is distributed to be introduced to the exhaust purification device on the upstream side or to be introduced to the exhaust purification device on the downstream side via the bypass passage.

More specifically, an exhaust purification system for an internal combustion engine includes: a first exhaust purification device that is provided in an exhaust passage of an internal combustion engine and purifies exhaust gas passing through the exhaust passage; a second exhaust purification device that is provided on a downstream side of the first exhaust purification device in the exhaust passage and purifies exhaust gas passing through the downstream side of the first exhaust purification device in the exhaust passage; a bypass passage that branches from an upstream side of the first exhaust purification device in the exhaust passage and merges with the exhaust passage at a portion on the downstream side of the first exhaust purification device and an upstream side of the second exhaust purification device in the exhaust passage to cause the exhaust gas passing through the exhaust passage to bypass the first exhaust purification device; an exhaust control valve that is provided between a branch portion toward the bypass passage and the first exhaust purification device in the exhaust passage or in the bypass passage and that is capable of switching between passing and blocking of the exhaust gas; and reducer supply device that supplies a reducer to the exhaust gas passing through the exhaust passage on an upstream side of the branch portion. The exhaust purification system for an internal combustion engine is characterized in that a reducer concentration in the exhaust gas flowing into the first exhaust purification device and a reducer concentration in the exhaust gas passing through the bypass passage are controlled by supplying the reducer intermittently to the exhaust gas from the reducer supply device to cause a periodic change in the reducer concentration in the exhaust gas passing through the exhaust passage and by opening/closing the exhaust control valve periodically to control an opening/closing timing of the exhaust control valve with respect to the periodic change in the reducer concentration.

That is, in the present invention, the reducer concentration in the branch portion where the bypass passage branches from the exhaust passage is periodically changed by supplying the reducer to the exhaust gas intermittently from the reducer supply device. The exhaust control valve provided to the exhaust passage or the bypass passage is opened or closed periodically. Also, the opening/closing timing of the exhaust control valve with respect to the periodic change in the reducer concentration is controlled.

In other words, by controlling an overlapping period of a time period in which the reducer concentration is high within a change cycle of the reducer concentration in the branch portion and a time period in which the exhaust control valve is opened within a cycle of opening of the exhaust control valve, the reducer amount passing through the exhaust control valve within a certain period of time is controlled. Accordingly, the reducer concentration in the exhaust gas flowing into the first exhaust purification device and the reducer concentration in the exhaust gas flowing into the second exhaust purification device via the bypass passage are controlled separately.

Accordingly, with a simple configuration of the combination of the single reducer supply device and the single exhaust control valve and by simple control, the reducer concentration in the exhaust gas flowing into the first exhaust purification device and the reducer concentration in the exhaust gas flowing directly into the second exhaust purification device via the bypass passage can be controlled with a high degree of freedom. As a result, temperature increase control of the first and second exhaust purification devices and removal control of the matter to be removed by purification which is accumulated therein can be performed separately with a high degree of freedom.

In the present invention, the reducer concentration in the exhaust gas flowing into the upstream side exhaust purification device and the reducer concentration in the exhaust gas passing through the bypass passage may be controlled by synchronizing the opening/closing timing of the exhaust control valve with the change in the reducer concentration in the branch portion toward the bypass passage in the exhaust passage.

That is, by causing a cycle of the change of the reducer concentration in the branch portion of the exhaust passage and the bypass passage and a cycle of opening/closing the exhaust control valve to be substantially the same and adjusting respective phases, the reducer supplied from the reducer supply device is distributed to be introduced to the first exhaust purification device on the upstream side or to be introduced to the second exhaust purification device on the downstream side via the bypass passage. Accordingly, it is possible to control the overlapping of the time period in which the reducer concentration is high within the change cycle of the reducer concentration in the branch portion and the time period in which the exhaust control valve is opened within the cycle of opening the exhaust control valve and to control the reducer amount passing through the exhaust control valve within the certain period of time, merely by adjusting the respective phases of the periodic changes. As a result, the reducer concentration in the exhaust gas flowing into the upstream side exhaust purification device and the reducer concentration in the exhaust gas passing through the bypass passage can be controlled more efficiently and with a high degree of freedom.

Also, the present invention may be configured such that the exhaust control valve is provided in the bypass passage, the second exhaust purification device includes a catalyst having an oxidation capacity, and a time period in which the exhaust control valve is closed and a time period in which the reducer supplied to the exhaust gas by the reducer supply device passes through the branch portion and the reducer concentration in the exhaust gas in the branch portion increases are synchronized.

That is, in the configuration in which the exhaust control valve is provided in the bypass passage and the second exhaust purification device includes the catalyst having the oxidation capacity, the exhaust control valve is closed while the reducer supplied from the reducer supply device passes through the branch portion from the exhaust passage toward the bypass passage, so that the exhaust gas having a high reducer concentration preferentially flows into the first exhaust purification device.

Accordingly, the reducer concentration in the exhaust gas flowing into the first exhaust purification device can be increased (for example, a rich spike can be deepened) with simpler control, and the reducer can be dispersed throughout the entire first exhaust purification device. Generally, when the reducer concentration in the exhaust gas flowing into the first exhaust purification device is increased, the amount of the reducer slipping through the first exhaust purification device increases. However, according to the present invention, since the exhaust gas having a high oxygen concentration can be supplied from the bypass passage to the exhaust passage on the downstream side of the first exhaust purification device, the reducer that has slipped through can be sufficiently oxidized in the second exhaust purification device. Accordingly, it is possible to more reliably suppress the reducer from being released outside the vehicle.

Also, the present invention may be configured such that the exhaust control valve is provided in the bypass passage, and a time period in which the exhaust control valve is opened and a time period in which the reducer supplied to the exhaust gas by the reducer supply device passes through the branch portion and the reducer concentration in the exhaust gas in the branch portion increases are synchronized.

That is, in the configuration in which the exhaust control valve is provided in the bypass passage, the exhaust control valve is opened while the reducer supplied from the reducer supply device passes through the branch portion, so that the exhaust gas having the high reducer concentration preferentially flows into the second exhaust purification device via the bypass passage. Accordingly, it is possible to suppress consumption of the reducer in the first exhaust purification device or an excessive temperature increase of the first exhaust purification device due to the reducer being consumed in the first exhaust purification device, when the temperature of the second exhaust purification device is raised by introducing the reducer thereto, for example.

Also, in the present invention, a cycle of an intermittent supply of the reducer by the reducer supply device may be greater than or equal to a limit opening/closing cycle based on a mechanical responsiveness of the exhaust control valve.

In the present invention, the opening/closing timing of the exhaust control valve is controlled with respect to the periodic change in the reducer concentration in the exhaust gas. In this case, when a cycle of supplying the reducer by the reducer supply device is extremely short with respect to the mechanical responsiveness of the exhaust control valve, it may be difficult to control the opening/closing timing of the exhaust control valve with high precision with respect to the periodic change in the reducer concentration in the exhaust gas.

Thus, in the present invention, the cycle of the intermittent supply of the reducer by the reducer supply device may be greater than or equal to the limit opening/closing cycle based on the mechanical responsiveness of the exhaust control valve. Here, the limit opening/closing cycle is the opening/closing cycle if the cycle of the intermittent supply of the reducer by the reducer supply device is shorter than it, it is difficult to control the opening/closing timing of the exhaust control valve with high precision with respect to the periodic change in the reducer concentration in the exhaust gas. For example, the limit opening/closing cycle may be a minimum cycle capable of maintaining a square wave as the waveform of the change in opening degree of the exhaust control valve.

Accordingly, by opening/closing the exhaust control valve, the reducer supplied from the reducer supply device can be distributed to be introduced to the first exhaust purification device on the upstream side or to be introduced to the second exhaust purification device on the downstream side via the bypass passage more reliably. In this case, the rich spike width in the intermittent supply of the reducer by the reducer supply device may be, for example, from a minimum of 1 second to a maximum of 5 seconds.

The rich spike refers to a spike-shaped waveform of the reducer supply when the reducer is supplied intermittently from the reducer supply device to the exhaust gas. That is, the time period in which the reducer concentration is high within the change cycle of the reducer concentration is formed by the rich spike. The rich spike may be formed by continuously supplying the reducer from the reducer supply device or may be formed by supplying the reducer in a further minute pulseform from the reducer supply device.

Also, in the present invention, the second exhaust purification device may be arranged in an underfloor of a vehicle mounted with the internal combustion engine.

In the case where the first exhaust purification device is arranged in a maniverter position in a general vehicle, the second exhaust purification device is often arranged in the underfloor of the vehicle. In such a case, since the heat of the second exhaust purification device is easily taken away by external air, the temperature of the second exhaust purification device easily decreases. Thus, by applying the present invention to such a configuration, the advantageous effect of the present invention can be obtained more effectively. That is, according to the present invention, the reducer concentrations in the exhaust gas flowing into the first exhaust purification device and into the second exhaust purification device can be controlled separately with a high degree of freedom. Therefore, the temperature decrease of the second exhaust purification device can be suppressed more reliably.

Also, the present invention may be configured such that the first exhaust purification device includes a catalyst having an oxidation capacity, and a periodic opening/closing of the exhaust control valve is inhibited to close the exhaust control valve and the reducer supplied from the reducer supply device is introduced to the first exhaust purification device to raise a temperature of the first exhaust purification device in a case where a temperature of the exhaust gas flowing into the second exhaust purification device is less than or equal to a predetermined value.

That is, in the case where the temperature of the exhaust gas flowing into the second exhaust purification device is low, the temperature of the second exhaust purification device cannot be raised sufficiently, and catalysis cannot be sufficiently induced by any amount of the reducer introduced to the second exhaust purification device in this state. As a result, the catalyst of the second exhaust purification device may be cooled to lose an active state or the introduced reducer may cause clogging.

Thus, in the present invention, a direct introduction of the reducer to the second exhaust purification device via the bypass passage is inhibited in the case where the temperature of the exhaust gas flowing into the second exhaust purification device is less than or equal to the predetermined value, so that the reducer is always introduced preferentially to the first exhaust purification device. Accordingly, the temperature of the first exhaust purification device can first be raised sufficiently, and the temperature of the exhaust gas flowing into the second exhaust purification device can be raised.

Here, the predetermined value is the temperature of the exhaust gas as a threshold value, if the temperature of the exhaust gas flowing into the second exhaust purification device is lower than or equal to the predetermined value, it is determined to be difficult to sufficiently induce catalysis even if the reducer is supplied to the second exhaust purification device. In this case, when the exhaust control valve is closed to raise the temperature of the first exhaust purification device, the rich spike width in the intermittent supply of the reducer by the reducer supply device may be made narrower compared to when the periodic opening/closing of the exhaust control valve is performed.

That is, in the case of preferentially introducing the reducer to the first exhaust purification device when the temperature of the exhaust gas flowing into the second exhaust purification device is less than or equal to the predetermined value, the purpose of introducing the reducer is to raise the temperature of the exhaust gas on the downstream side of the first exhaust purification device. Thus, in this case, it is preferable to continuously supply the reducer to the first exhaust purification device in a cycle as short as possible and in stable amounts. On the other hand, in the case where the temperature of the exhaust gas flowing into the second exhaust purification device is higher than the predetermined value and the exhaust control valve is opened or closed to introduce the reducer to the second exhaust purification device, control of removing the matter to be removed by purification which is accumulated in the second exhaust purification device such as, for example, the PM regeneration is often performed. Thus, in this case, in order to spread the reducer throughout the entire second exhaust purification device, the increase of the reducer concentration by one rich spike is preferably large.

Thus, in the present invention, when the exhaust control valve is closed to raise the temperature of the first exhaust purification device, the rich spike width in the intermittent supply of the reducer by the reducer supply device is made narrower compared to the case in which the periodic opening/closing of the exhaust control valve is performed.

Accordingly, the temperature of the first exhaust purification device can be raised more efficiently when the temperature of the first exhaust purification device is raised, and the reducer can be dispersed throughout the second exhaust purification device more reliably in the case of performing the regeneration treatment of the purification performance of the second exhaust purification device.

Note that means to solve problems in the present invention may be used in any possible combination.

BEST MODES FOR CARRYING OUT THE INVENTION

Hereinafter, best modes for carrying out the present invention will be described in detail with examples with reference to the drawings.

First Embodiment

Figure 1:
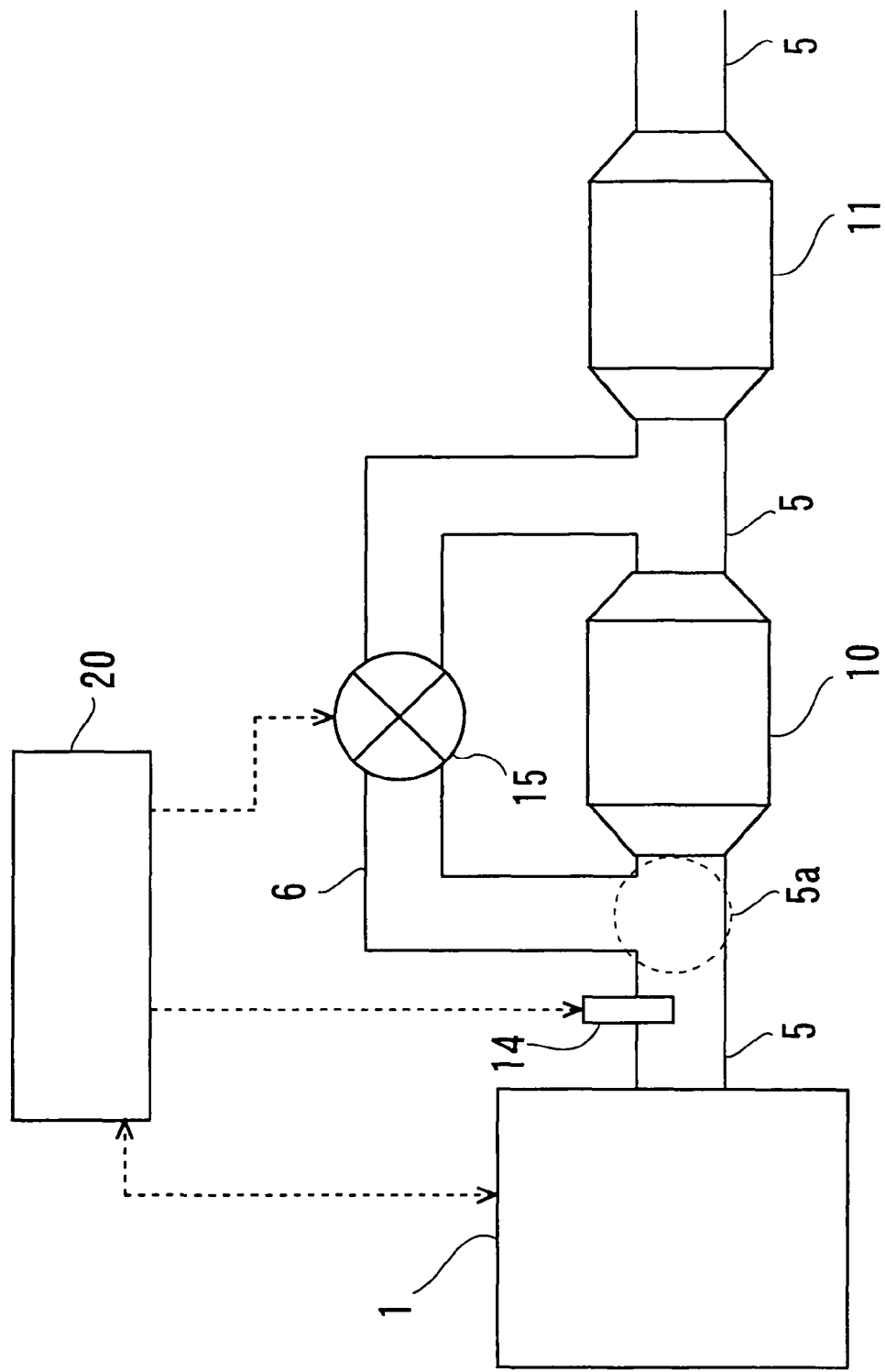
FIG. 1 is a view showing a schematic configuration of an internal combustion engine according to a first embodiment of the present invention and an exhaust system and a control system thereof.

FIG. 1 is a view showing a schematic configuration of an internal combustion engine according to this embodiment and an exhaust system and a control system thereof. An internal combustion engine 1 shown in FIG. 1 is a diesel engine. Note that, in FIG. 1, the inside of the internal combustion engine 1 and an intake system thereof are omitted.

In FIG. 1, the internal combustion engine 1 is connected with an exhaust pipe 5 through which exhaust gas discharged from the internal combustion engine 1 flows, and the exhaust pipe 5 is connected with a muffler (not shown) on the downstream thereof. In the exhaust pipe 5, a storage-reduction type NOx catalyst (hereinafter abbreviated as "NSR") 10 that purifies NOx in the exhaust gas is arranged. On the downstream side of the NSR 10 in the exhaust pipe 5, a DPNR 11 in which the storage-reduction type NOx catalyst is supported by a filter that traps particulate matter in the exhaust gas is arranged.

In a branch portion 5a on the upstream of the NSR 10, a bypass pipe 6 branches from the exhaust pipe 5. The bypass pipe 6 includes a switching valve 15 that performs switching between blocking the exhaust gas from the internal combustion engine and passing it through the bypass pipe 6. The bypass pipe 6 merges with the exhaust pipe 5 between the NSR 10 and the DPNR 11.

By operating the switching valve 15 and causing the exhaust gas from the internal combustion engine 1 to directly pass through the exhaust pipe 5, the exhaust gas can be caused to pass through both the NSR 10 and the DPNR 11. In a similar manner, by causing the exhaust gas from the internal combustion engine 1 to pass through the bypass pipe 6, the exhaust gas can be caused to bypass the NSR 10 and pass through only the DPNR 11.

Note that, on the upstream side of the NSR 10 in the exhaust pipe 5, a fuel addition valve 14 that adds fuel as a reducer to the exhaust gas during a NOx reduction treatment or a SOx poisoning regeneration treatment of the NSR 10 or the NOx reduction treatment, the SOx poisoning regeneration treatment, or a PM regeneration treatment of the DPNR 11 is arranged. Here, the NSR 10 corresponds to a first exhaust purification device, and the DPNR 11 corresponds to a second exhaust purification device. The switching valve 15 corresponds to an exhaust control valve, and the fuel addition valve 14 corresponds to reducer supply device.

To the internal combustion engine 1 and the exhaust system configured as described above, an electronic control unit (ECU) 20 for controlling the internal combustion engine 1 and the exhaust system is attached. The ECU 20 is a unit that controls the operation state or the like of the internal combustion engine 1 according to an operation condition of the internal combustion engine 1 or a request of a driver and performs a control for an exhaust purification system including the NSR 10 and the DPNR 11 of the internal combustion engine 1.

The ECU 20 is connected with sensors such as an airflow meter, a crank position sensor, an accelerator position sensor, or the like (not shown) for control of the operation state of the internal combustion engine 1 via an electrical wiring so that an output signal is input to the ECU 20. The ECU 20 is further connected with a fuel injection valve or the like (not shown) in the internal combustion engine 1 via an electrical wiring and is connected with the switching valve 15, the fuel addition valve 14, or the like of this embodiment via an electrical wiring so that the ECU 20 can perform control thereof.

The ECU 20 includes a CPU, a ROM, a RAM, and the like. The ROM stores programs for performing various controls of the internal combustion engine 1 and maps storing data. A DPNR temperature control routine of this embodiment described below is also one of the programs stored in the ROM in the ECU 20.

A case of performing a NOx reduction treatment of the NSR 10 in the configuration described above will be discussed. In this case, the switching valve 15 is closed to add fuel to the exhaust gas from the fuel addition valve 14. However, attempting to disperse the fuel in the entire region of the NSR 10 causes the fuel addition amount to increase, and a large amount of the fuel slips through the NSR 10. Further, since a large portion of oxygen in the exhaust gas is consumed by catalysis in the NSR 10, it may be difficult to sufficiently oxidize the fuel that has slipped through in the DPNR 11. Accordingly, there has been a possibility of the fuel that has slipped through the NSR 10 also slipping through the DPNR 11 without being oxidized and being emitted outside a car.

Next, a case of performing a PM regeneration treatment or the NOx reduction treatment of the DPNR 11 in the configuration described above will be discussed. In this case, the switching valve 15 is opened to add the fuel from the fuel addition valve 14, causing exhaust gas having the same air-fuel ratio as the exhaust gas supplied to the DPNR 11 to flow into the NSR 10. Thus, a large amount of the fuel is supplied also to the NSR 10 to raise the temperature of the DPNR 11, and there has been a possibility of the temperature of the NSR 10 being raised excessively.

In order to solve these inconveniences, it has been necessary to introduce a three-way valve capable of adjusting the ratio of the exhaust gas passing through the exhaust pipe 5 and the bypass pipe 6 or arrange a fuel addition valve independently in the exhaust pipe 5 and the bypass pipe 6, possibly causing an increase in the number of parts or cost.

Thus, in this embodiment, the fuel is intermittently added from the fuel addition valve 14, and control is performed to synchronize the opening/closing of the switching valve 15 in the bypass pipe 6 with a time period in which the fuel added from the fuel addition valve 14 reaches the branch portion 5a.

Figure 2:
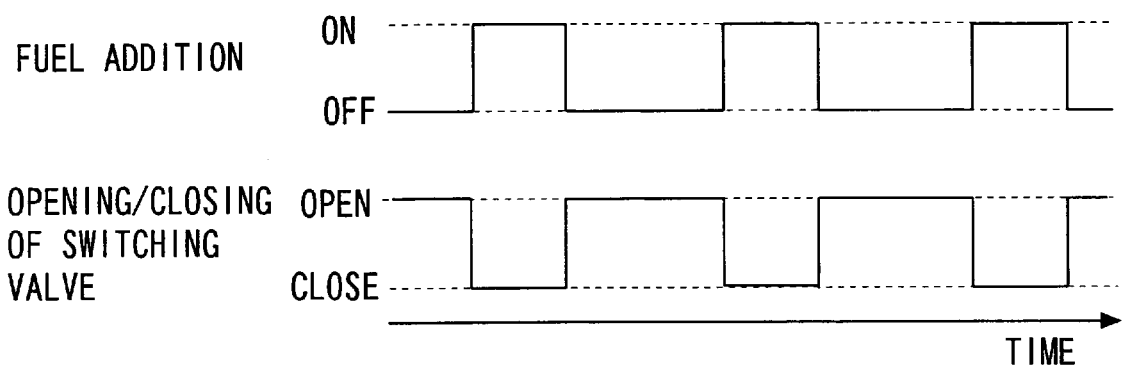
FIG. 2 is a first example of a time chart showing timings of fuel addition and opening/closing of a switching valve according to the first embodiment of the present invention.

First, the case of performing the control during the NOx reduction treatment of the NSR 10 will be described. FIG. 2 is a time chart showing the relation of a timing of the fuel addition from the fuel addition valve 14 and an opening/closing timing of the switching valve 15 in this case.

In this case, as shown in FIG. 2, a cycle of the fuel addition from the fuel addition valve 14 and a cycle of opening the switching valve 15 are substantially the same. Phases of the two are controlled such that the switching valve 15 is opened when the fuel addition from the fuel addition valve 14 is finished and the switching valve 15 is closed when the fuel addition from the fuel addition valve 14 is started. Accordingly, the exhaust gas can pass through the bypass passage 6 during a period in which the fuel addition from the fuel addition valve 14 is stopped. Note that, in this embodiment, a point in time when the fuel is added to the exhaust gas from the fuel addition valve 14 and a point in time when the added fuel reaches the branch portion 5a are deemed to be the same, since the distance between the fuel addition valve 14 and the branch portion 5a is short.

With this control, a flow rate of the exhaust gas decreases when the fuel added from the fuel addition valve 14 is introduced to the NSR 10. Thus, a sufficient reaction time of the fuel introduced to the NSR 10 can be ensured, and the fuel that slips through can be reduced. As a result, a NOx purification rate in the NSR 10 can be improved, and the fuel consumption in the NOx reduction treatment can be reduced. Also, the amount of heat taken away by the exhaust gas can be reduced, and the fuel consumption for activation and temperature increase of the NSR 10 can be reduced.

In the case of dispersing the fuel as the reducer in the entire NSR 10 in order to perform the NOx reduction treatment, it is necessary to increase the amount of the fuel added from the fuel addition valve 14 and increase the degree of richness of the fuel introduced to the NSR 10. Accordingly, there is a possibility that the amount of the fuel slipping through the NSR 10 without reacting increases. In the case where the oxygen concentration in the exhaust gas is low on the downstream side of the NSR 10, sufficiently consuming the fuel that has slipped through the NSR 10 in the DPNR 11 on the downstream side may be difficult. In contrast, in this embodiment, the exhaust gas having a high oxygen concentration can be introduced to the exhaust pipe 5 between the NSR 10 and the DPNR 11 via the bypass pipe 6 after the fuel addition from the fuel addition valve 14 is finished. Therefore, the fuel that has slipped through the NSR 10 can be consumed more reliably in the DPNR 11. Note that the NOx that has passed through the bypass pipe 6 while the switching valve 15 is opened can be purified in the DPNR 11.

Figure 3:
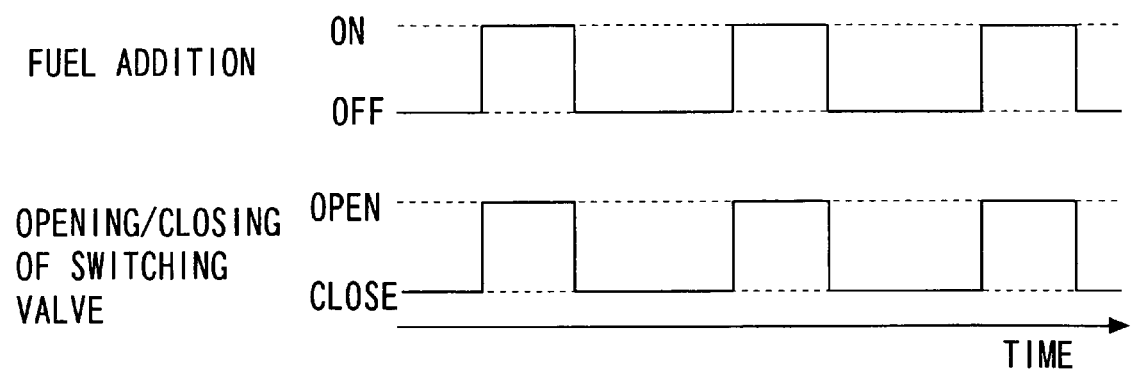
FIG. 3 is a second example of the time chart showing the timings of the fuel addition and opening/closing of the switching valve according to the first embodiment of the present invention.

Next, the case of performing the PM regeneration treatment of the DPNR 11 will be described. FIG. 3 is a time chart showing the relation of the timing of the fuel addition from the fuel addition valve 14 and the timing of opening/closing of the switching valve 15.

In this case, as shown in FIG. 3, the cycle of the fuel addition from the fuel addition valve 14 and the cycle of opening the switching valve 15 are substantially the same in a similar manner to those of FIG. 2. The phases of the two are controlled such that the switching valve 15 is opened when the fuel addition from the fuel addition valve 14 is started and the switching valve 15 is closed when the fuel addition from the fuel addition valve 14 is finished. Accordingly, the exhaust gas can pass through the bypass passage 6 during a period in which the fuel addition from the fuel addition valve 14 is performed. Note that a point in time when the fuel is added to the exhaust gas from the fuel addition valve 14 and a point in time when the added fuel reaches the branch portion 5a are again deemed to be the same.

In this case, the switching valve 15 in the bypass pipe 6 is opened when the fuel addition to the exhaust gas from the fuel addition valve 14 is started. Thus, the fuel added from the fuel addition valve 14 can be introduced to the DPNR 11 via the bypass pipe 6. On the other hand, the switching valve 15 in the bypass pipe 6 is closed when the fuel addition to the exhaust gas from the fuel addition valve 14 is finished. Thus, the exhaust gas having a high air-fuel ratio can be caused to flow into the NSR 10 preferentially. Accordingly, the temperature increase of the NSR 10 can be suppressed and an excessive temperature increase of the NSR 10 can be suppressed during the PM regeneration treatment or the like of the DPNR 11. Even if the exhaust gas itself passing through the bypass pipe 6 is low in temperature, the temperature of the DPNR 11 can easily be raised since the temperature of the exhaust gas that has passed through the NSR 10 is raised.

In this manner, by performing the fuel addition from the fuel addition valve 14 intermittently and opening/closing the switching valve 15 in synchronization with the timing of the fuel addition, the air-fuel ratios of the exhaust gas flowing into the NSR 10 and the DPNR 11 can be controlled separately, and the regeneration treatments of purification performances of the NSR 10 and the DPNR 11 can be performed suitably with a high degree of freedom.

Note that, in the embodiment described above, a point in time when the fuel is supplied to the exhaust gas from the fuel addition valve 14 and a point in time when the added fuel reaches the branch portion 5a are deemed to be the same, since the distance between the fuel addition valve 14 and the branch portion 5a is short. However, the point in time when the added fuel reaches the branch portion 5a may be a point in time when a delay time $\Delta t$ has elapsed after the fuel has been added to the exhaust gas from the fuel addition valve 14, in the case where the distance between the fuel addition valve 14 and the branch portion 5a is long, for example. This $\Delta t$ may be an invariable constant value or may be read as needed from a map in relation to the operation state. In this case, the timings of opening/closing the switching valve in FIGS. 2 and 3 are delayed by $\Delta t$.

Figure 4:
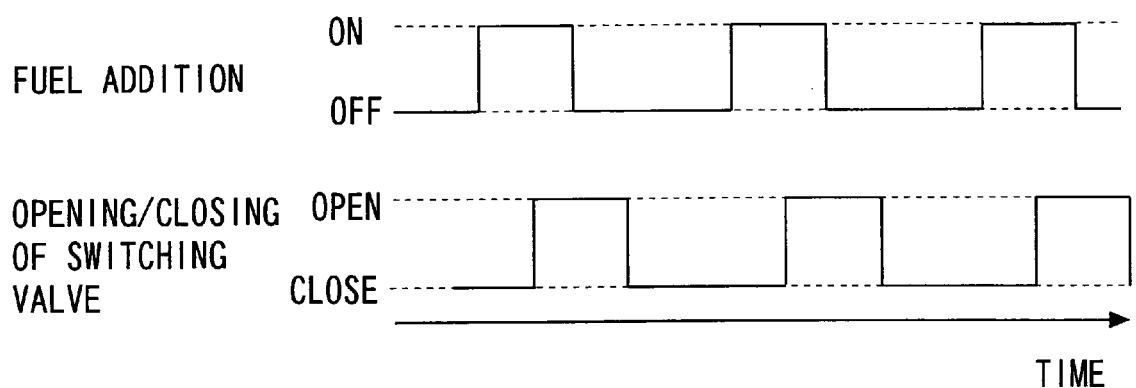
FIG. 4 is a third example of the time chart showing the timings of the fuel addition and opening/closing of the switching valve according to the first embodiment of the present invention.

In the case of distributing and introducing the fuel added to the exhaust gas from the fuel addition valve 14 to the NSR 10 and the DPNR 11 in further appropriate proportions, the following control may be performed. That is, even in the case where a point in time when the fuel is added to the exhaust gas from the fuel addition valve 14 and a point in time when the added fuel reaches the branch portion 5a are deemed to be the same, the cycle of the fuel addition from the fuel addition valve 14 and the cycle of opening the switching valve 15 are made substantially the same and the phases of the two are appropriately adjusted, as shown in FIG. 4. Thus, the added fuel can be introduced to the NSR 10 during a period in which the fuel addition is performed and the switching valve 15 is closed, and the added fuel can be introduced to the DPNR 11 via the bypass pipe 6 during a period in which the fuel addition is performed and the switching valve 15 is opened. Accordingly, the air-fuel ratios of the exhaust gas flowing into the NSR 10 and the DPNR 11 can be controlled separately with a high degree of freedom.

Note that the control for the timing of the fuel addition from the fuel addition valve 14 and the timing of opening/closing the switching valve 15 described based on FIGS. 2 to 4 corresponds to supplying the reducer intermittently to the exhaust gas from the reducer supply device to cause a periodic change in the reducer concentration in the exhaust gas passing through an exhaust passage, opening/closing the exhaust control valve periodically, and controlling the opening/closing timing of the exhaust control valve with respect to the periodic change in the reducer concentration, and corresponds to synchronizing the opening/closing timing of the exhaust control valve with the change in the reducer concentration in the exhaust gas in the branch portion.

The cycle of the fuel addition from the fuel addition valve 14 described based on FIGS. 2 to 4 is preferably defined in accordance with the mechanical responsiveness of the switching valve 15, because the fuel addition from the fuel addition valve 14 is synchronized with the opening/closing timing of the switching valve 15. That is, when the cycle of the fuel addition from the fuel addition valve 14 becomes shorter than a limit cycle based on the mechanical responsiveness of the switching valve 15, there is a possibility that the waveform of the opening/closing of the switching valve 15 cannot maintain a square wave and the air-fuel ratios of the exhaust gas flowing into the NSR 10 and the DPNR 11 cannot be controlled accurately. For example, the width of the square wave (rich spike width) of the fuel addition from the fuel addition valve 14 may be approximately 1 to 5 seconds. The cycle of the fuel addition may be greater than or equal to twice the rich spike width. Note that the limit cycle corresponds to a limit opening/closing cycle of this embodiment.

Note that, in the embodiment described above, the exhaust purification system using the NSR 10 as the first exhaust purification device and the DPNR 11 as the second exhaust purification device has been described. However, the combination of the first exhaust purification device and the second exhaust purification device is not limited thereto.

For example, in the exhaust purification system that employs the control shown in FIG. 2, the first exhaust purification device may be a DPNR, and the second exhaust purification device may be a NSR, an oxidation catalyst CCo, a three-way catalyst, or the like. The control shown in FIG. 2 may be employed in a case of performing a SOx poisoning recovery treatment of the NSR serving as the first exhaust purification device or the SOx poisoning recovery treatment or the PM regeneration treatment of the DPNR serving as the first exhaust purification device. Also, for example, in the exhaust purification system applied with the control shown in FIG. 3, the first exhaust purification device may be the DPNR, the oxidation catalyst CCo, the three-way catalyst, or the like, and the second exhaust purification device may be the NSR, a filter that traps particulate matter, a combination of the filter and the oxidation catalyst CCo, or the like. The control shown in FIG. 3 may be employed in a case of performing the SOx poisoning recovery treatment or the NOx reduction treatment of the NSR serving as the second exhaust purification device or the SOx poisoning recovery treatment, the PM regeneration treatment, or the NOx reduction treatment of the DPNR serving as the second exhaust purification device.

Second Embodiment

Next, a second embodiment of the present invention will be described. In this embodiment, an example of the configuration described in the first embodiment will be described in which the reducer is preferentially supplied to the NSR 10 to raise the temperature of the exhaust gas without performing the control of intermittent opening/closing of the switching valve 15 in the case where the temperature of the exhaust gas flowing into the DPNR 11 is low.

The internal combustion engine and the exhaust system thereof in this embodiment are equivalent to those shown in FIG. 1. Here, a case will be discussed where the cycle of the fuel addition from the fuel addition valve 14 and the cycle of opening the switching valve 15 are substantially the same and the phases of the two are controlled such that the switching valve 15 is opened when the fuel addition from the fuel addition valve 14 is started.

In the case where such control is executed, for example, from an initial stage of the fuel addition by the fuel addition valve 14, the bed temperature of the NSR 10 hardly increases, and as a result, the fuel is introduced to the DPNR 11 while the temperature of the exhaust gas flowing into the DPNR 11 can not be sufficiently raised. Thus, there has been a possibility of inconvenience such as an occurrence of clogging due to the fuel at a front end surface of the DPNR 11 or the temperature of the DPNR 11 being prevented from increasing to fall below the active temperature.

Thus, in this embodiment, in the case where the temperature of the exhaust gas flowing into the DPNR 11 is acquired and the temperature is lower than a threshold value, the control of periodically opening/closing the switching valve 15 is not performed, the switching valve 15 is closed, and the fuel added from the fuel addition valve 14 is introduced preferentially to the NSR 10.

Figure 5:
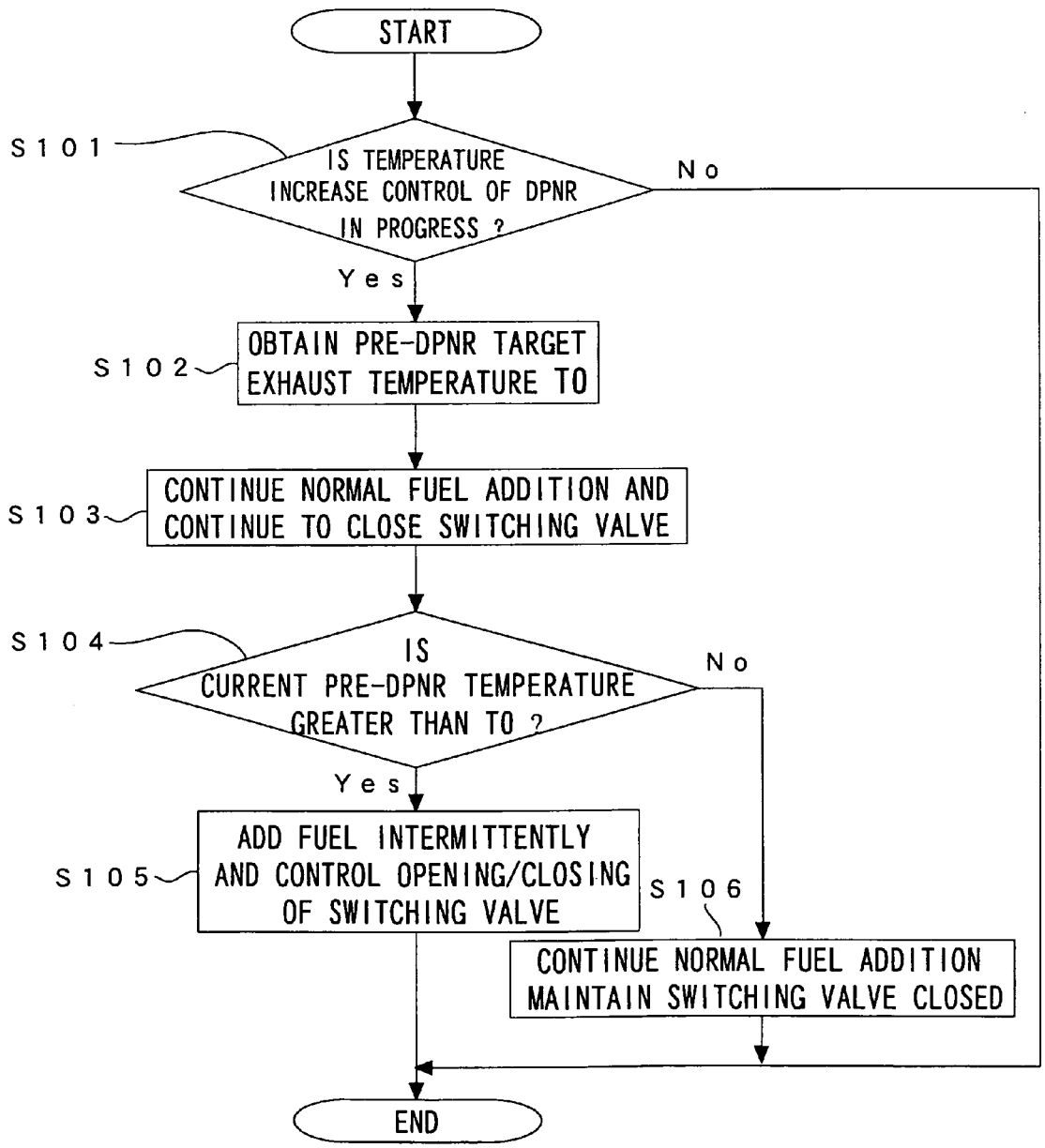
FIG. 5 is a flowchart showing a DPNR temperature control routine according to a second embodiment of the present invention.

FIG. 5 shows the DPNR temperature control routine of this embodiment. The routine is a program stored in the ROM in the ECU 20, and is executed every predetermined time period by the ECU 20 while the internal combustion engine 1 is in operation.

When the routine is executed, whether a temperature increase control of the DPNR 11 is in progress is first determined in S101. The temperature increase control refers to the control of adding the fuel as the reducer to the DPNR 11 to increase the bed temperature of the DPNR 11 such as in the PM regeneration treatment, the SOx poisoning recovery treatment, or the like. In the case where the temperature increase control of the DPNR 11 is determined to be not in progress, the routine is temporarily terminated. On the other hand, in the case where the temperature increase control is determined to be in progress, the process proceeds to S102.

In S102, a pre-DPNR target exhaust temperature T0 is obtained. The pre-DPNR target exhaust temperature T0 is a threshold value, if the temperature of the exhaust gas flowing into the DPNR 11 is lower than or equal to which, it is determined that deactivation or clogging due to the fuel of the DPNR 11 may occur when the control of synchronizing the start of the fuel addition from the fuel addition valve 14 and the opening of the switching valve 15 is performed. The pre-DPNR target exhaust temperature T0 may be obtained by reading an invariable constant value (for example, 250 to 300° C.) from the ROM, or may be obtained by reading a value from a map, in accordance with the type of the temperature increase control or the accumulated amount of the matter to be removed by purification. When the process of the S102 is finished, the process proceeds to S103.

In S103, the fuel addition as the normal temperature increase control of the DPNR 11 is performed, and the switching valve 15 continues to be in the closed state. Specifically, the rich spike control in which the cycle of the fuel addition from the fuel addition valve 14 is approximately less than or equal to 1 second is continued. When the process of S103 is finished, the process proceeds to S104.

In S104, whether the temperature of the exhaust gas being introduced to the DPNR 11 at this time point is higher than the pre-DPNR target exhaust temperature T0 is determined. The temperature of the exhaust gas being introduced to the DPNR 11 at this time point may be detected by a sensor (not shown), or may be estimated from the operation state, intake air amount, or the like. In the case where the temperature of the exhaust gas being introduced to the DPNR 11 is determined to be higher than the pre-DPNR target exhaust temperature T0, the process proceeds to S105. On the other hand, in the case where the temperature of the exhaust gas being introduced to the DPNR 11 is determined to be less than or equal to the pre-DPNR target exhaust temperature T0, the process proceeds to S106.

In S105, the cycle of the fuel addition from the fuel addition valve 14 and the cycle of opening the switching valve 15 are made substantially the same, and the control is executed such that the switching valve 15 is opened in a time period when the fuel addition from the fuel addition valve 14 is started.

In S106, the fuel addition as the normal temperature increase control of the DPNR 11 such as that performed in S103 is performed and the switching valve 15 continues to be in the closed state. When the process of S105 or S106 is finished, the routine is temporarily terminated.

As described above, in this embodiment, the control of performing the fuel addition as the normal temperature increase control of the DPNR 11 and maintaining the switching valve 15 to be in the closed state and the control of causing the cycle of the fuel addition from the fuel addition valve 14 and the cycle of opening the switching valve 15 to be substantially the same and opening the switching valve 15 in the time period when the fuel addition from the fuel addition valve 14 is started are selectively used in accordance with the temperature of the exhaust gas flowing into the DPNR 11.

Accordingly, by causing the fuel added from the fuel addition valve 14 to preferentially pass through the bypass pipe 6 when the temperature of the exhaust gas flowing into the DPNR 11 is sufficiently high, the temperature of the DPNR 11 can be raised while suppressing an excessive temperature increase of the NSR 10 upstream thereof. On the other hand, in the case where the exhaust gas flowing into the DPNR 11 is low in temperature, it is possible to raise the temperature of the exhaust gas by actively causing the fuel added from the fuel addition valve 14 to pass through the NSR 10, promote the temperature increase of the DPNR 11, and suppress clogging or deactivation due to the fuel of the DPNR 11.

In performing the normal fuel addition in S103 and S106 of the DPNR temperature control routine, the cycle may be less than or equal to 1 second, and the rich spike width may be less than or equal to 0.5 seconds. Accordingly, the fuel can be supplied to the NSR 10 more stably, and the temperature of the NSR 10 and the exhaust gas from the NSR 10 can be raised more efficiently. In performing the fuel addition according to S105, the cycle may be approximately 5 to 10 seconds, and the rich spike width may be approximately 2 to 4 seconds. Accordingly, the decrease amount of the air-fuel ratio by one rich spike can be increased to cause the fuel to more easily spread throughout the entire DPNR 11. Thus, the PM regeneration treatment or the SOx poisoning recovery treatment can be performed more reliably with respect to the entire DPNR 11.

Note that, in the process of S103 of the DPNR temperature control routine, the process may proceed to S104 while continuing the control executed in S105 of the previous routine if such control is continuing at that time point. Accordingly, when a state in which the temperature of the exhaust gas introduced to the DPNR 11 is higher than the pre-DPNR target exhaust temperature T0 has continued, it is possible to continue, without interruption, the control of causing the cycle of the fuel addition from the fuel addition valve 14 and the cycle of opening the switching valve 15 to be substantially the same and opening the switching valve 15 when the fuel addition from the fuel addition valve 14 is started.

Figure 6:
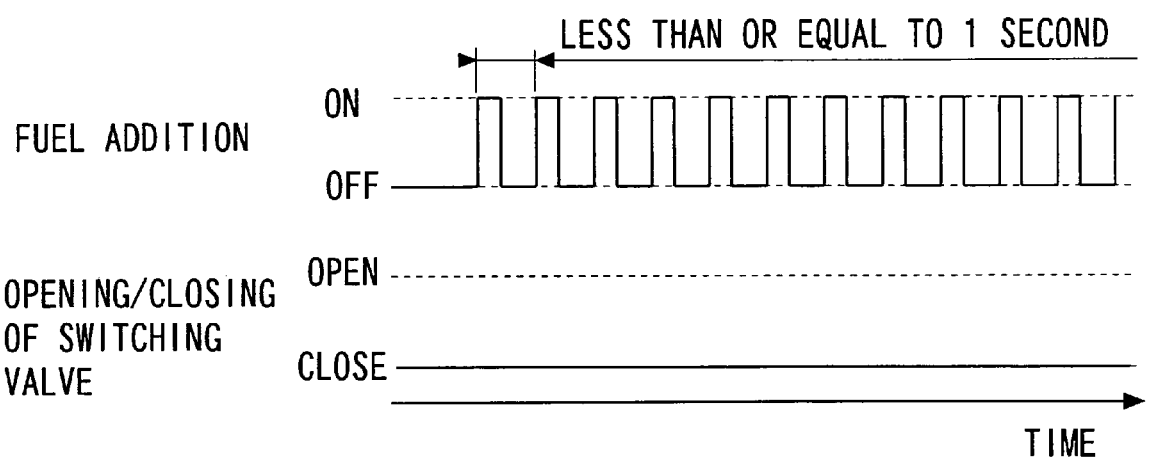
FIG. 6 is a first example of a time chart showing timings of fuel addition and opening/closing of a switching valve according to the second embodiment of the present invention.
Figure 7:
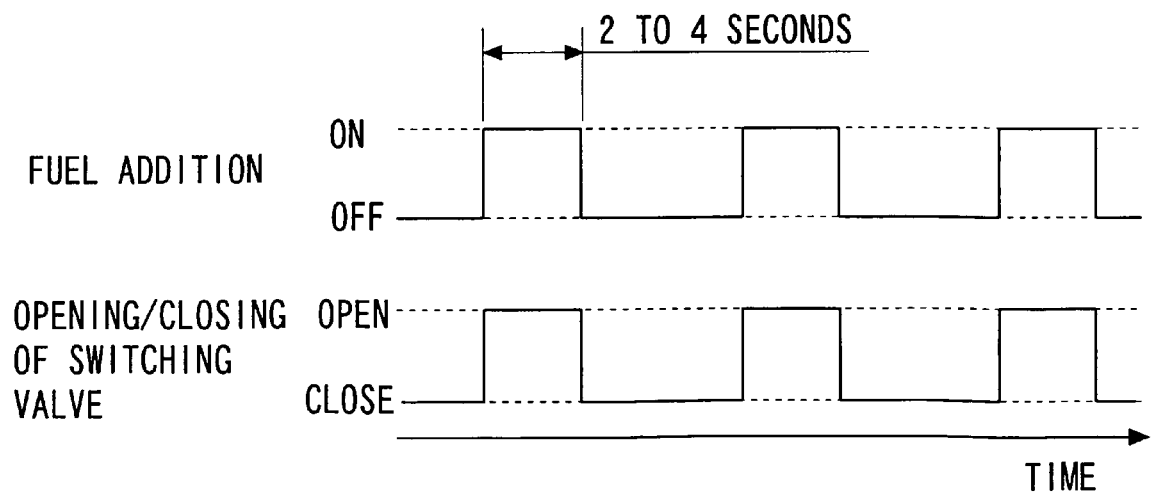
FIG. 7 is a second example of the time chart showing the timings of the fuel addition and opening/closing of the switching valve according to the second embodiment of the present invention.

Note that FIG. 6 shows the fuel addition timing and the opening degree of the switching valve 15 in the case where the fuel addition as the normal temperature increase control of the DPNR 11 is continued and the switching valve 15 continues to be in the closed state. FIG. 7 shows the fuel addition timing and the opening/closing timing of the switching valve 15 in the case where the control is performed to cause the cycle of the fuel addition from the fuel addition valve 14 and the cycle of opening the switching valve 15 to be substantially the same and open the switching valve 15 in the time period in which the fuel addition from the fuel addition valve 14 is started.

In the exhaust system of the internal combustion engine 1 shown in FIG. 1 according to this embodiment, the NSR 10 may be arranged in a maniverter position and the DPNR 11 may be arranged in an underfloor. In the exhaust system having such arrangements, the heat of the DPNR 11 arranged in the underfloor is easily taken away by external air, and clogging due to fuel or misfire easily occurs due to a temperature decrease. Thus, by applying the control described above to the exhaust system of the internal combustion engine 1 having such a configuration, the temperature increase of the DPNR 11 can be promoted more efficiently, and the deactivation or clogging due to the fuel of the DPNR 11 can be suppressed more effectively.

Although the switching valve 15 is provided in the bypass pipe 6 in the embodiment described above, the arrangement of the switching valve 15 is not limited to the bypass pipe 6 as long as it is within the scope of the technical idea of the present invention. For example, the switching valve 15 may be provided between the branch portion 5a in the exhaust pipe 5 and the NSR 10 such that the fuel is added from the fuel addition valve 14 intermittently and the opening/closing timing of the switching valve 15 is controlled. Controlling the air-fuel ratio of the exhaust gas flowing into the NSR 10 and the air-fuel ratio of the exhaust gas flowing into the DPNR 11 with the control of the switching valve 15 is within the scope of the technical idea of the present invention.

Note that the exhaust purification system using the NSR 10 as the first exhaust purification device and the DPNR 11 as the second exhaust purification device has been described in this embodiment as well. However, the combination of the first exhaust purification device and the second exhaust purification device is not limited thereto.

For example, in the exhaust purification system to which the flowchart shown in FIG. 5 applies, the first exhaust purification device may be the DPNR, the oxidation catalyst CCo, the three-way catalyst, or the like, and the second exhaust purification device may be the NSR, the filter that traps particulate matter, the combination of the filter and the oxidation catalyst CCo, or the like. The first exhaust purification device has a function of raising the temperature of the exhaust gas with the introduced fuel, and therefore preferably has an oxidation capacity.

Each of the first exhaust purification device and the second exhaust purification device in the exhaust purification system of the present invention may be an exhaust purification device in which various catalysts, filter, or the like are combined.

In the embodiment described above, an example in which the fuel addition valve 14 that adds the fuel as the reducer to the exhaust gas serves a function as the reducer supply device has been described. However, the present invention can be applied to an exhaust purification system using a liquid other than the fuel, e.g., urea solution, as the reducer.

INDUSTRIAL APPLICABILITY

With the present invention, the reducer concentrations in the exhaust gas flowing into an exhaust purification device on the upstream side and an exhaust purification device on the downstream side that are provided in series in an exhaust passage, can be controlled separately with a simple configuration.

The invention claimed is:

1. An exhaust purification system for an internal combustion engine comprising:
    a first exhaust purification device that is provided in an exhaust passage of an internal combustion engine and purifies exhaust gas passing through said exhaust passage;
    a second exhaust purification device that is provided on a downstream side of said first exhaust purification device in said exhaust passage and purifies exhaust gas passing through the downstream side of said first exhaust purification device in said exhaust passage;
    a bypass passage that branches from an upstream side of said first exhaust purification device in said exhaust passage and merges with said exhaust passage at a portion on the downstream side of said first exhaust purification device and an upstream side of said second exhaust purification device in said exhaust passage to cause the exhaust gas passing through said bypass passage to bypass said first exhaust purification device;

an exhaust control valve that is provided between a branch portion toward said bypass passage and said first exhaust purification device in said exhaust passage or in said bypass passage and that is capable of switching between passing and blocking of the exhaust gas;

a reducer injector that supplies a reducer to the exhaust gas passing through said exhaust passage on an upstream side of said branch portion; and an electronic control unit configured to control the exhaust control valve and the reducer injector such that a reducer concentration in the exhaust gas flowing into said first exhaust purification device and a reducer concentration in the exhaust gas passing through said bypass passage are controlled by supplying the reducer intermittently to the exhaust gas from said reducer injector to cause a periodic change in the reducer concentration in the exhaust gas passing through said exhaust passage and opening/closing said exhaust control valve periodically to control an opening/closing timing of said exhaust control valve based on the periodic change in the reducer concentration.

2. The exhaust purification system for an internal combustion engine according to claim 1, wherein the reducer concentration in the exhaust gas flowing into said first exhaust purification device and the reducer concentration in the exhaust gas passing through said bypass passage are controlled by synchronizing the opening/closing timing of said exhaust control valve with the change in the reducer concentration in the exhaust gas in said branch portion.

3. The exhaust purification system for an internal combustion engine according to claim 2, wherein
said exhaust control valve is provided in said bypass passage,
said second exhaust purification device includes a catalyst having an oxidation capacity, and
a time period in which said exhaust control valve is closed and a time period in which the reducer supplied to the exhaust gas by said reducer injector passes through said branch portion while the exhaust control valve is open and the reducer concentration in the exhaust gas in said branch portion increases are synchronized.

4. The exhaust purification system for an internal combustion engine according to claim 2, wherein
said exhaust control valve is provided in said, bypass passage, and
a time period in which said exhaust control valve is opened and a time period in which the reducer supplied to the exhaust gas by said reducer injector passes through said branch portion and the reducer concentration in the exhaust gas in said branch portion increases are synchronized.

5. The exhaust purification system for an internal combustion engine according to claim 1, wherein a cycle of the intermittent supply of said reducer by said reducer injector is greater than or equal to a limit opening/closing cycle based on a mechanical responsiveness of said exhaust control valve.

6. The exhaust purification system for an internal combustion engine according to claim 2, wherein a cycle of the intermittent supply of said reducer by said reducer injector is greater than or equal to a limit opening/closing cycle based on a mechanical responsiveness of said exhaust control valve.

7. The exhaust purification system for an internal combustion engine according to claim 3, wherein a cycle of the intermittent supply of said reducer by said reducer injector is greater than or equal to a limit opening/closing cycle based on a mechanical responsiveness of said exhaust control valve.

8. The exhaust purification system for an internal combustion engine according to claim 4, wherein a cycle of the intermittent supply of said reducer by said reducer injector is greater than or equal to a limit opening/closing cycle based on a mechanical responsiveness of said exhaust control valve.

9. The exhaust purification system for an internal combustion engine according to claim 5, wherein a rich spike width in said intermittent supply of said reducer by said reducer injector ranges from a minimum of 1 second to a maximum of 5 seconds.

10. The exhaust purification system for an internal combustion engine according to claim 1, wherein said second exhaust purification device is arranged in an underfloor of a vehicle mounted with said internal combustion engine.

11. The exhaust purification system for an internal combustion engine according to claim 2, wherein said second exhaust purification device is arranged in an underfloor of a vehicle mounted with said internal combustion engine.

12. The exhaust purification system for an internal combustion engine according to claim 3, wherein said second exhaust purification device is arranged in an underfloor of a vehicle mounted with said internal combustion engine.

13. The exhaust purification system for an internal combustion engine according to claim 4, wherein said second exhaust purification device is arranged in an underfloor of a vehicle mounted with said internal combustion engine.

14. The exhaust purification system for an internal combustion engine according to claim 5, wherein said second exhaust purification device is arranged in an underfloor of a vehicle mounted with said internal combustion engine.

15. The exhaust purification system for an internal combustion engine according to claim 6, wherein said second exhaust purification device is arranged in an underfloor of a vehicle mounted with said internal combustion engine.

16. The exhaust purification system for an internal combustion engine according to claim 7, wherein said second exhaust purification device is arranged in an underfloor of a vehicle mounted with said internal combustion engine.

17. The exhaust purification system for an internal combustion engine according to claim 8, wherein said second exhaust purification device is arranged in an underfloor of a vehicle mounted with said internal combustion engine.

18. The exhaust purification system for an internal combustion engine according to claim 9, wherein said second exhaust purification device is arranged in an underfloor of a vehicle mounted with said internal combustion engine.

19. The exhaust purification system for an internal combustion engine according to claim 4, wherein
said first exhaust purification device includes a catalyst having an oxidation capacity, and
the periodic opening/closing of said exhaust control valve is inhibited to close said exhaust control valve and the reducer supplied from said reducer injector is introduced to said first exhaust purification device to raise a temperature of said first exhaust purification device in a case where a temperature of the exhaust gas flowing into said second exhaust purification device is less than or equal to a predetermined value.

20. The exhaust purification system for an internal combustion engine according to claim 19, wherein a rich spike width in the intermittent supply of the reducer by said reducer injector is made narrower compared to a case of performing the periodic opening/closing of said exhaust control valve when said exhaust control valve is closed to raise the temperature of said first exhaust purification device.

* * * * *